United States Patent

Ockleston

[11] Patent Number: 6,009,762
[45] Date of Patent: *Jan. 4, 2000

[54] FLUID FLOW DETECTOR

[76] Inventor: Grant Andrew Ockleston, 6 Johnson Road, Heston, Middlesex, United Kingdom, TW5 9CQ

[*] Notice: This patent issued on a continued prosecution application filed under 37 CFR 1.53(d), and is subject to the twenty year patent term provisions of 35 U.S.C. 154(a)(2).

[21] Appl. No.: 08/732,313
[22] PCT Filed: Apr. 28, 1995
[86] PCT No.: PCT/GB95/00980
§ 371 Date: Feb. 18, 1997
§ 102(e) Date: Feb. 18, 1997
[87] PCT Pub. No.: WO95/30129
PCT Pub. Date: Nov. 9, 1995

[30] Foreign Application Priority Data

Apr. 29, 1994 [GB] United Kingdom .................. 9408578

[51] Int. Cl.[7] ....................................................... G01F 1/28
[52] U.S. Cl. ...................................... 73/861.74; 73/861.71; 73/861.77
[58] Field of Search .................................. 73/204.21, 221, 73/224, 861.51, 861.52, 861.54, 861.58, 861.74, 861.77, 861.71

[56] References Cited

U.S. PATENT DOCUMENTS

| 1,653,177 | 12/1927 | Herz . | |
|---|---|---|---|
| 1,903,713 | 4/1933 | Baule | 73/861.74 |
| 3,381,530 | 5/1968 | Lamb | 73/861.74 |
| 3,681,983 | 8/1972 | Alexander . | |
| 3,914,994 | 10/1975 | Banner | 73/861.75 |
| 4,599,907 | 7/1986 | Kraus et al. | 73/861.74 |
| 4,614,122 | 9/1986 | Graves | 73/861.74 |
| 4,791,254 | 12/1988 | Polverari | 73/861.74 |
| 5,021,619 | 6/1991 | Hutchinson | 73/861.74 |
| 5,086,650 | 2/1992 | Harrington et al. | 73/204.21 |
| 5,275,042 | 1/1994 | Carson et al. . | |

Primary Examiner—Max Noori
Attorney, Agent, or Firm—McDermott, Will & Emery

[57] ABSTRACT

A system and method for determining a volume rate fluid, particularly liquid such as sewage, comprises a conduit for passage of sewage, a freely pivotable flap valve mounted at an outlet of the conduit and carrying a sensor. This sensor monitors the angular position of the flap valve and provides an electronic output representative of fluid volume flow through the conduit.

30 Claims, 3 Drawing Sheets

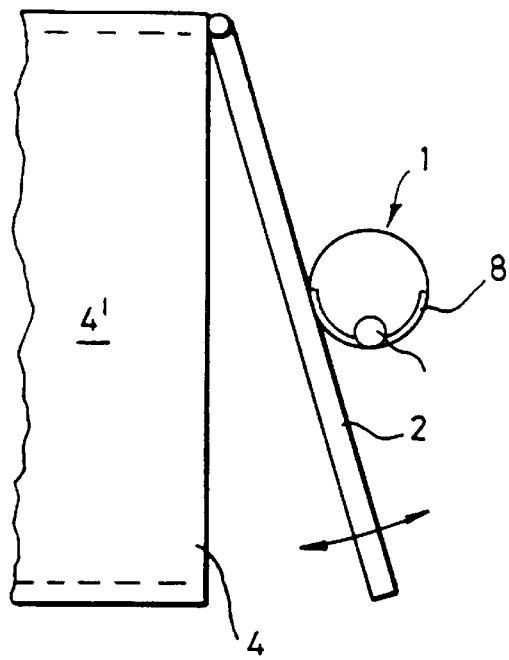
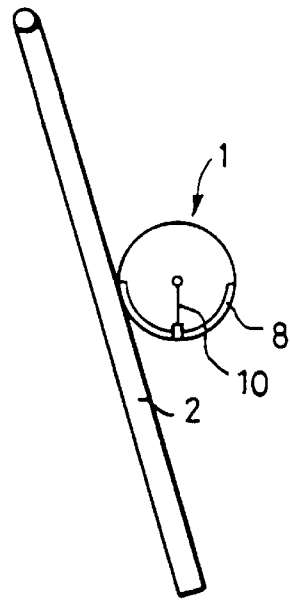
FIG.3    FIG.4
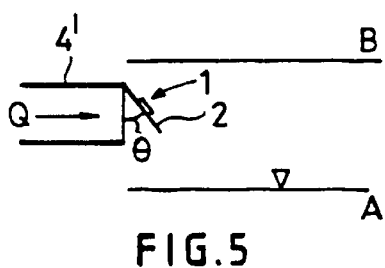
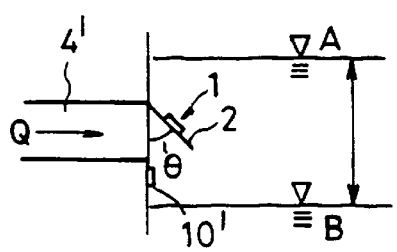
FIG.5
FIG.6
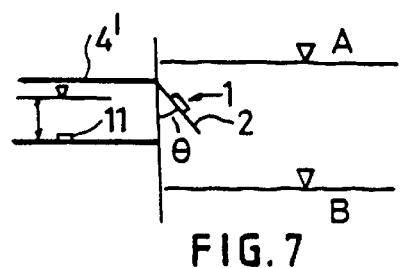
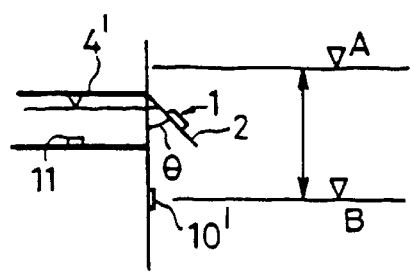
FIG.7
FIG.8

FLUID FLOW DETECTOR

The invention relates to a detector for detecting movement of closures, and particularly the detector comprising part of a system and method for determining a volume flow rate of a liquid.

It is often necessary to monitor volume flow rate of a fluid, particularly of liquid such as sewage. This is because flow of the sewage is or can be sensitive, particularly if it is discharging into a holding well or water way. A small change in the flow can alter the whole manner of operation of a sewage works for example, which could then lead to expensive waste of time and chemicals used in fluid treatment, and also the balance of sewage to the water way can be upset. Prior methods of detecting changes in fluid flow are usually manual, and thus expensive, or include complicated arrangements such as bubblers to detect depth. This is also expensive and prone to error.

It is accordingly an object of the invention to seek to mitigate these disadvantages.

According to a first aspect of the invention there is provided a system for determining a volume flow rate of a fluid, comprising a conduit which is freely movable by the fluid to allow passage thereof, sensor means adapted to sense the position of the valve and provide an electronic output which is representative of fluid volume flow through the conduit.

The valve may comprise a pivotably mounted flap valve on the conduit, particularly being pivoted in an outlet of the conduit. This provides a relatively simple yet efficient construction.

The sensor means may be carried by the flap valve, on an external major surface thereof, or being set into a body of the flap valve. These constructions provide a simple yet accurate mounting of the flap valve for monitoring the angle of the flap valve particularly where the sensor means may comprise a gravity actuable electronic sensor means. This provides a positive response to angular movement of the flap valve.

The sensor means may comprise an actuator element which is adjustable in position depending on angular movement of the flap valve, particularly in a preferred embodiment, an electrically conductive rollable element mounted for rolling along a resistive track between two electrically conductive strips.

The rollable element may comprise a sphere of mercury and the strips may comprise two carbon strips spaced apart a distance substantially equal to the diameter of the sphere of mercury. This arrangement provides a relatively simple yet positive and efficient way of monitoring the state of the flap valve.

There may be electronic means to convert the output from the sensor means into data concerning the fluid flow.

The data may comprise fluid volume flow through the conduit.

There may be means for electronically triggering a sampler device for providing analysis data relating to the fluid in the conduit.

Further the apparatus may include electronic means to provide data relating to physical and/or chemical parameters of the fluid.

The electronic means may be adapted to store said data in real time.

The fluid may be a liquid and the electronic means may comprise an additional sensor means for sensing a depth of liquid downstream of the flap valve.

There may be a further sensor means for sensing a depth of liquid in the conduit upstream of the flap valve. This provides for a theoretical determination of a desired volume flow, and means for monitoring a departure therefrom.

The electronic means may comprise an electronic monitoring system in a housing remote from the flap valve.

The electronic monitoring system may comprise a logging system.

The may be means providing for manual or automatic access to data stored in the logging system.

According to a second aspect of the invention, there is provided a method for determining the volume flow rate of a fluid, comprising the steps of providing a conduit for passage of the fluid, providing a valve across the conduit freely movable by the fluid to allow passage thereof, sensing the position of the valve when fluid flows therepast, and providing an electronic output commensurate with the position of the valve which is representative of the fluid volume flow through the conduit.

The flap valve may be angularly movable. This provides a readily controllable method.

The method may include utilising the electronic output to provide a sample of the fluid for analytical purposes.

The method may include utilising the electronic output to provide a measure of physical and/or chemical parameters of the fluid.

The data may be stored in real time.

The method may include accessing the data manually or automatically.

The fluid may comprise a liquid, and the electronic data may comprise data showing the angle of the flap valve, and the depth of liquid downstream thereof.

The electronic data may also comprise data relating to the depth of liquid upstream of the flap valve.

The liquid may be sewage and the data may be utilised to monitor and/or adjust the state of a sewage system of which the conduit is a part.

A system and method embodying the invention are hereinafter described, by way of example, with reference to the accompanying drawings.

FIG. 3 shows to an enlarged scale the flap valve of FIG. 1;

FIG. 4 shows to an enlarged scale a modified flap valve according to FIG. 3; and FIGS. 5 to 8 show schematic respective different arrangements of system according to the invention.

Figure 1:
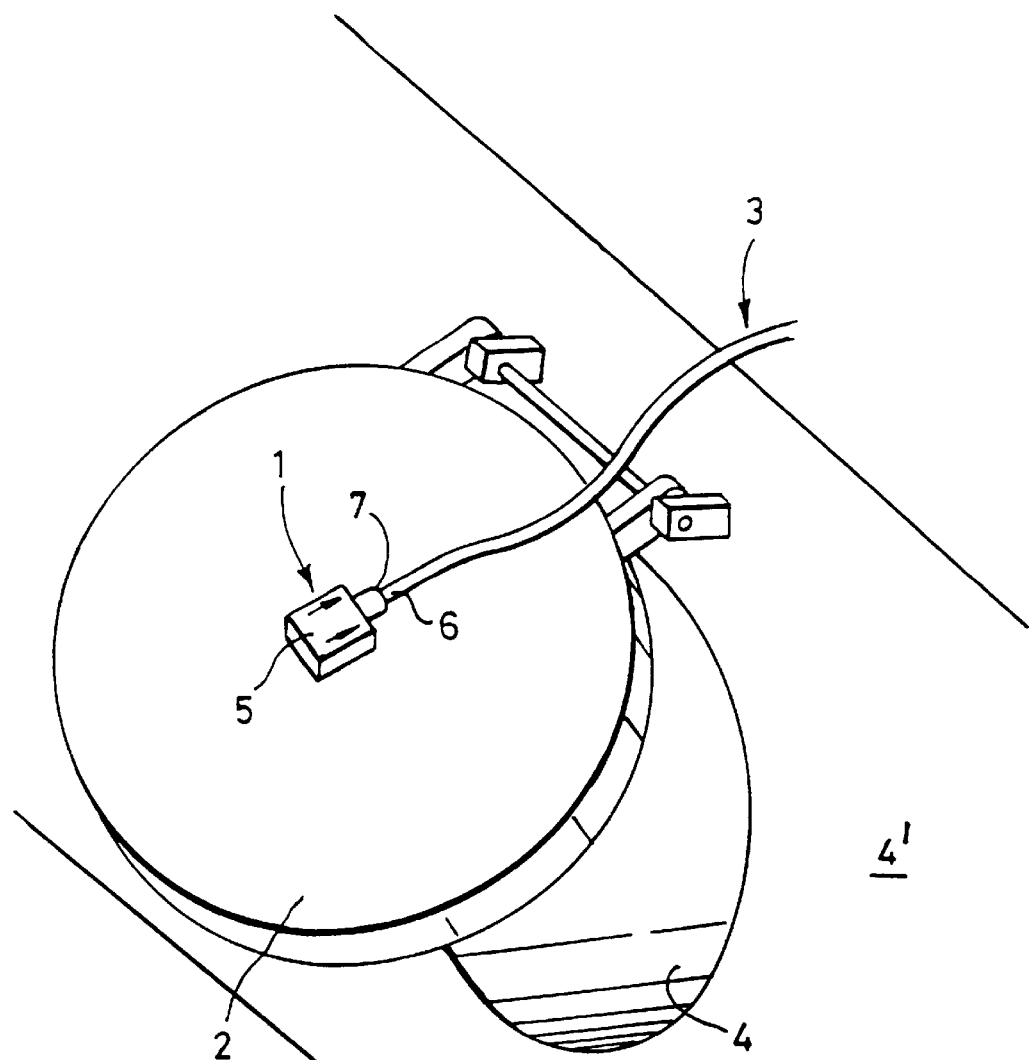
FIG. 1 shows a perspective view of one hinged flap valve, such as is mounted over a combined sewer overflow and according to the invention.

Referring to the drawing there are shown systems for determining a volume flow rate of fluid, in the embodiment a liquid in the form of sewage. The systems each include a sensor means 1 mounted on a downstream face of a closure 2. The sensor means has an electronic supply 3 the sensor means being adapted to detect movement of the closure 2 in relation to the aperture 4 adjacent which it is mounted. The closure 2 is an inclined pivotably mounted flap valve, the aperture 4 being the outlet or mouth of a conduit 4' for sewage in a sewage treatment works. The sensor means 1 produces a measurable response to pivotable movement of the flap valve, which movement can then be monitored.

The sensor means 1 comprises a body shell 5 which may be constructed from a plastics material. The shell is provided with fixing means such as bolts, adhesive (not shown) to allow the sensor means 1 to be mounted on the flap valve 2. The shell may also be provided with orientation means, such as printed markings to allow correct placement on the flap valve 2. An electrical supply, in the form of an insulated cable or flex 6 enters the shell 5 at an aperture 7 which is rendered waterproof by any suitable means such as grommets for example. In a preferred embodiment, the shell or housing of the sensor means is "potted in", i.e. sealed in a resin to make it sealed and waterproof.

Within the shell 5 is mounted the sensor means 1. The sensor means 1 in FIGS. 1 to 3 comprises a pair of carbon strips 8, mounted in the shell 5 substantially parallel to one another, and connected at one end to an electrical supply. The strips form a track or groove in which is mounted a ball 9 of mercury, adapted to contact both walls of the track 8. The track 8 is provided with a floor of a dielectric or resistive material.

FIG. 4 shows an embodiment of sensor means 1 in the form of a pendulum device 10, which swings to sweep over the track 8 to determine angular movement of the flap valve 2.

It will be understood that the flap valve and its sensing means is part of an electronic system for monitoring the position of the sensor means and hence the angular position of the flap valve. The electronic system includes a main housing (not shown) remote from the flap valve and connected electrically to it by the cable or flex 6. The housing includes a logging element or logger which logs the angle of the flap valve and therefore by comparing this angular position data with data already collected concerning angular position and volume flow, it is possible to monitor the volume flow or size of discharge, and hence to control the sewage output. The main housing, which may be on a river bank, in a manhole or on a manhole cover also houses other electronic devices such as a modem or a plurality of modems, connected with the cable 6, whereby other parameters relating to the sewage can be monitored, and accessed. The logging element or logger is battery powered, giving a life of some three years on average.

The logging element receives the data from the sensor means and, combined with the date and time of receiving data, provides instantaneous information concerning the volume flow rate of sewage through the conduit or sewer 4'. The logging element is arranged to interrogate the sensor means over desired set time internals, which may be seconds, minutes, hours, day etc., and if the sensor means provides data showing that this angular position is the desired one, the logging element will not react. However, if the angular position alters by say 2° or more, the logging element reacts by storing the data. Thus power, and the memory capacity of the logging element, are enhanced by the action of the logging element in only reacting when there is angular change in the flap valve's position. The logging element thus provides data access, and an alarm system, and associated software is used to set up the logging element initially, to set its threshold parameters, and to set date, time intervals, and changes in the action of the logging element according to changing parameters, in the sewage works. The software is able to interrogate this logging element, pull down data therefrom, and print out a spread sheet from which changes in system parameters can be deduced.

The modem is an (IN) modem, so is line driven, but could be (IN/OUT) in which case additional batteries are required therefor.

The embodiment shown in FIG. 5 is a system where the flap valve angle θ is monitored against a flow rate Q of sewage through the conduit 4', the outlet discharging into a constant depth of water which can be below the flap valve at A or above it at B, in which latter case the valve is immersed, or at any level therebetween. A and B are constant. Where A and B are liable to vary, an additional sensor means external to the conduit or sewer 4' is required, as shown at 10 in FIG. 6. There are thus two sensors in the embodiment. Both the embodiments of FIGS. 5 and 6 require the prior collection of data which is fed to the logging element in setting up the electronic system. FIG. 5 is based on a mathematical system, and FIG. 6 on a dimensional analysis system.

The system can however be used without the collection of prior data relating to the fluid system by setting up the logging element based on theoretical considerations concerning flow rate. In this case, shown in FIG. 7, there is also a depth sensor means 11 which monitors the depth of liquid flowing through the conduit or sewer 4'. The two systems can be combined, as shown in FIG. 8. In both FIG. 7 and FIG. 8, there is no need for the collection of extra data, the theoretical model allows the sensor means 1,10,11 to provide data to the logging element which then can determine changes in the flow.

Thus in all embodiments, it will be understood that a very accurate monitoring of in-sewer (in a sewage works) parameters can be achieved. By comparing actual flows with the theoretical, as maintained by the logging element in the FIG. 8 embodiment for example, it is possible to monitor the change of state of the flap valve, via its angle, and hence to determine the cause of any change, for example a faulty pump. It is thus possible to utilise the volume flow change as shown by alterations in the angular position of the valve to control the whole sewage works' system.

The system is then capable of triggering, on a preset time and/or angular movement of the flap valve 2, a sampling system(s) such that physical and/or chemical property(ies) of the sewage passing the flap valve can be determined. This is achieved via a electrical signal suitable for initiating the sampling system utilised.

The system is moreover capable of triggering, on a preset time and/or angular movement of the flap valve, a physical and/or chemical device(s) such that physical and/or chemical properties of the sewage passing the flap valve can be determined.

The monitoring system incorporates the logging element so as to allow any information on the nature and size of the medium passing the flap valve to be stored. The logging element may be incorporated within the monitoring system in the field or be remote having a continuous/intermittent communications medium obtaining data from the monitoring system. The stored data may be logged in real-time to facilitate the determination of duration of the event whereby a medium passed the flap valve.

The system is capable of allowing manual or automatic access to the data. The data may be stored locally by the logging element incorporated within the monitoring system, and/or remotely utilising a communications medium accessing the monitoring information on a continuous/intermittent basis. This may take the form of:

Manual Site Visits

The identified data access procedure can be utilised on monitoring systems incorporating local logging elements. An operative(s) will be required to visit each of the monitoring system(s) to down load the stored data onto a personal computer or similar portable electronic device capable of interfacing with the logger unit(s);

New/Existing Telecommunication Line Connection

This method involves the monitoring system incorporating the modem (or similar device) connected to the local logger elements and connecting the monitoring system to a new or existing telecommunications line. This facility allows a direct continuous/intermittent communications link with the monitoring system from a single/number of source (s);

Existing Telecommunication Line+Radio Link

This combines an existing/new telecommunications' line with a radio link. The existing telecommunications lines are strategically placed such that the radio link provides the final communications link between the a radio sub-station(s) and the monitoring system in the field; and Existing/New Radio System An existing ratio network such as the Paknet radio system or deployment of a similar new radio system can be utilised to provide a communications link between a central/number of base(s) and the monitoring system(s) to allow date retrieval.

It will be understood that for the monitoring system to be capable of informing the user at any time, via a communications medium, the state of any part of the system, the monitoring system would generally require a in/out modem or similar device connected to a local logger element, and/or for a remote logging facility a continuous/intermittent communications link connected directly to the monitoring system(s). Actions by the monitoring system would be via a predetermined protocol sequence with/without user interface.

Figure 2:
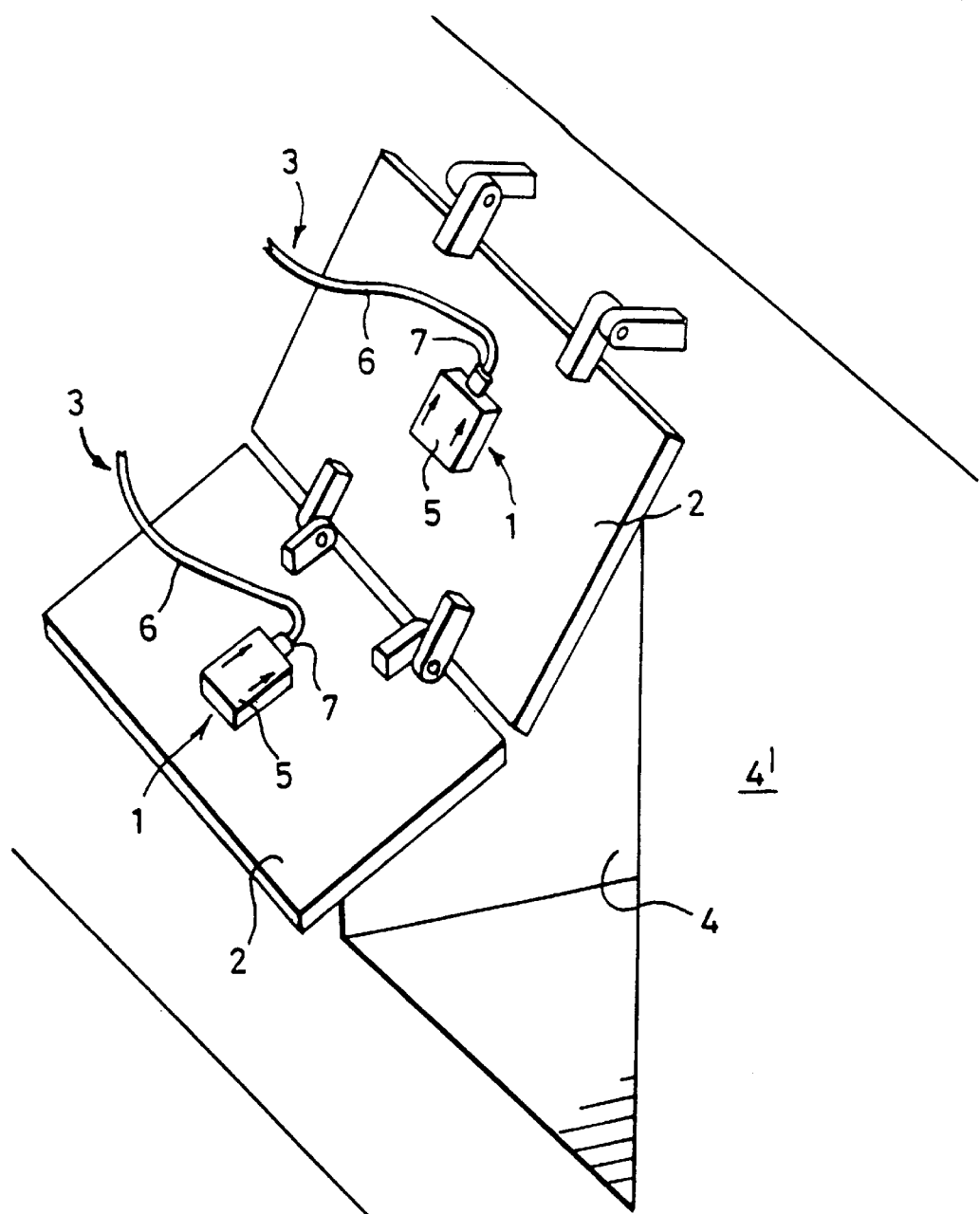
FIG. 2 shows a perspective view of a further hinged flap valve according to the invention.

It will be understood that the flap valve may be of any desired form. In FIG. 2, for example, it is a two part flap valve, one part being hinged to a sewer 4' and the other part hinged to the one part. The flap valves may be circular, egg-shaped square or of any other configuration.

In use, an electrical supply, preferably constant, is fed to the sensor means 1. Movement of the closure 2 from an open to a closed position or vice versa causes the mercury ball 9 to move from one end of the track to the other, and, depending on which end the eletrical supply is fed, the output of the sensor means 1 will vary. The sensor means 1 may be calibrated by manually moving the closure 2 over an angle, to allow the change in output to be converted to angular degrees.

The invention thus allows the detection of movement of flaps such as are mounted on combined sewer overflow pipes, and can alert operatives to variations in discharge of sewage. In addition, measurement of the angle of the flap can be used to determine the rate of egress of sewage.

It will also be understood that an ultra sound or infra red device may be used in place of the sensor means 1, there being a sensor at a fixed point, or vice versa. The logging element would then minimise distance, and software would connect to angular movement.

It will be understood that in all embodiments, the normal volume flow of the sewage is such that, for a given weight of the flap valve, that valve will assume a predetermined angle to allow outflow from conduit 4', whether the flap valve is (a) totally immersed, (b) partially immersed, or (c) wholly exposed to atmosphere. This known angle will not vary depending on (a), (b) or (c). Any change in angle is monitored by the sensor means thus providing a means of determining changes in flow, and hence changes in the sewage treatment works.

I claim:

1. A system for determining a volume flow rate of a fluid, comprising:
    a conduit for passage of the fluid;
    a valve across the conduit which is mechanically unbiased and freely movable solely by the fluid to allow passage thereof;
    sensor means adapted to sense the position of the valve and provide an electronic output which is representative of fluid volume flow through the conduit;
    an electronic monitoring system remote from the valve adapted to log the output from the sensor, and a physical or chemical property determining device,
    wherein the monitoring system is adapted to trigger said device on a preset time or angular movement of the valve.

2. A system according to claim 1, the valve comprising a pivotably mounted flap valve on the conduit.

3. A system according to claim 2, the flap valve being pivoted at an outlet of the conduit.

4. A system according to claim 2, the sensor means being carried by the flap valve.

5. A system according to claim 4, the sensor means being carried on an external major surface of the flap valve.

6. A system according to claim 4, the sensor means being carried on an internal major surface of the flap valve.

7. A system according to claim 4, the sensor means being set into the body of the flap valve.

8. A system according to claim 2, the sensor means comprising a gravity actuable electronic sensor means.

9. A system according to claim 8, the sensor means comprising an actuator element which is adjustable in position depending on angular movement of the flap valve.

10. A system for determining a volume flow rate of a fluid, comprising:
    a conduit for passage of the fluid;
    a valve across the conduit which is mechanically unbiased and freely movable solely by the fluid to allow passage thereof, the valve comprising a pivotably mounted flap valve on the conduit; and
    sensor means adapted to sense the position of the valve and provide an electronic output which is representative of fluid volume flow through the conduit, the sensor means comprising a gravity actuable electronic sensor means and an actuator element which is adjustable in position depending on angular movement of the flap valve,
    wherein the actuator element comprises an electrically conductive rollable element mounted for rolling along a resistive track between two electrically conductive strips.

11. A system according to claim 10, the rollable element comprising a sphere of mercury and the strips comprising two carbon strips spaced apart a distance substantially equal to the diameter of the sphere of mercury.

12. A system according to claim 1, including electronic means to convert the output from the sensor means into data concerning the fluid flow.

13. A system according to claim 12, the data comprising fluid volume flow through the conduit.

14. A system according to claim 12, including means for electronically triggering a sampler device for providing analysis data relating to the fluid in the conduit.

15. A system according to claim 12, including electronic means to provide data relating to physical and/or chemical parameters of the fluid.

16. A system according to claim 12, the electronic means being adapted to store said data in real time.

17. A system according to claim 12, the fluid being a liquid and the electronic means comprising an additional sensor means for sensing a depth of liquid downstream of the flap valve.

18. A system according to claim 17, comprising a further sensor means for sensing a depth of liquid in the conduit upstream of the flap valve.

19. A system according to any of claims 12 to 18, the electronic means comprising an electronic monitoring system in a housing remote from the flap valve.

20. A system according to claim 19, the electronic monitoring system comprising a logging system.

21. A system according to claim 20, including means providing for manual or automatic access to data stored in the logging system.

22. A method for determining the volume flow rate of a fluid, comprising the steps of:

providing a conduit for passage of the fluid;

providing a valve across the conduit which is mechanically unbiased and freely movable solely by the fluid to allow passage thereof;

sensing the position of the valve when fluid flows therepast;

providing an electronic output commensurate with the position of the valve which is representative of the fluid volume flow through the conduit;

monitoring the output; and triggering a physical or chemical property determining device on a preset time or angular movement of the valve.

23. A method according to claim 22, the flap valve being angularly movable.

24. A method according to claim 22, including utilising the electronic output to provide a sample of the fluid for analytical purposes.

25. A method according to claim 22, including utilising the electronic output to provide a measure of physical and/or chemical parameters of the fluid.

26. A method according to claim 22, including storing data in real time.

27. A method according to claim 22, including accessing the data manually or automatically.

28. A method according to claim 23, the fluid comprising a liquid, and the electronic data comprising data showing the angle of the flap valve, and the depth of liquid downstream thereof.

29. A method according to claim 28, the electronic data also comprising data relating to the depth of liquid upstream of the flap valve.

30. A method according to claim 28, the liquid being sewage and the data being utilised to monitor and/or adjust the state of a sewage system of which the conduit is a part.

\* \* \* \* \*